(12) United States Patent
Ono et al.

(10) Patent No.: US 6,636,985 B1
(45) Date of Patent: Oct. 21, 2003

(54) DISK STORAGE DEVICE AND A METHOD FOR PROCESSING DEFECTIVE SECTORS IN A DISK STORAGE DEVICE

(75) Inventors: Hiroyuki Ono, Fujisawa (JP); Hideo Asano, Machida (JP); Atsushi Kanamaru, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 09/591,257

(22) Filed: Jun. 9, 2000

(30) Foreign Application Priority Data

Jun. 11, 1999 (JP) .......................... 11-164625

(51) Int. Cl.[7] .......................... G06F 11/22; G11C 29/00
(52) U.S. Cl. .......................... 714/8; 714/42
(58) Field of Search .................... 714/8, 42; 369/53.15, 369/43

(56) References Cited

U.S. PATENT DOCUMENTS

| | | | |
|---|---|---|---|
| 5,844,911 A | 12/1998 | Schadegg et al. | |
| 5,872,800 A | 2/1999 | Glover et al. | |
| 6,034,831 A | 3/2000 | Dobbek et al. | |
| 6,147,943 A | * 11/2000 | Ogasawara et al. | 369/44.32 |
| 6,289,484 B1 | * 9/2001 | Rothberg et al. | 714/769 |
| 6,332,204 B1 | * 12/2001 | Russell | 714/710 |
| 6,442,715 B1 | * 8/2002 | Wilson | 714/710 |
| 6,446,156 B1 | * 9/2002 | Chia et al. | 711/4 |
| 6,467,054 B1 | * 10/2002 | Lenny | 714/42 |

FOREIGN PATENT DOCUMENTS

| | | |
|---|---|---|
| JP | 04-053605 | 3/1993 |
| JP | 05-074059 | 3/1993 |
| JP | 05-280794 | 5/1995 |
| JP | 07-134636 | 5/1995 |
| JP | 07-013181 | 11/1995 |
| JP | 07-295672 | 11/1995 |
| JP | 07-306812 | 11/1995 |
| JP | 08-180612 | 7/1996 |
| JP | 07-220397 | 3/1997 |
| JP | 09-062461 | 3/1997 |
| JP | 09-320003 | 12/1997 |
| JP | 11-066701 | 3/1999 |
| JP | 10-179121 | 1/2000 |
| WO | WO 98/03970 | 1/1998 |

OTHER PUBLICATIONS

Research Disclosure, International Business Machines Corp, Nov. 10, 1998, p. 1545.

* cited by examiner

Primary Examiner—Robert Beausoliel
Assistant Examiner—Anne L. Damiano
(74) Attorney, Agent, or Firm—G. Marlin Knight; Bracewell & Patterson, L.L.P.

(57) ABSTRACT

A disk storage device is disclosed for avoiding the instantaneous performance degradation as much as possible, and a method for processing a defective sector in such a disk storage device. There is executed a predetermined check related to a function of the disk storage device, preferably at least one of a read test, a write servo test, or a write test, when the disk storage device is in a waiting state where the disk storage device has no access from a host. The read test and write servo test are used to search for a defective sector on a disk and reassign the defective sector. The write test is used to indicate an abnormal condition of a head. Furthermore, the disk storage device includes a detector for detecting the waiting state, and a check logic for executing a predetermined check.

22 Claims, 2 Drawing Sheets

DISK STORAGE DEVICE AND A METHOD FOR PROCESSING DEFECTIVE SECTORS IN A DISK STORAGE DEVICE

BACKGROUND OF THE INVENTION

1. Technical Field

The present invention relates to a disk storage device which searches for a defective sector on the disk and reassigns an alternate sector in advance, and a method for processing the defective sector in such a disk storage device.

2. Description of the Related Art

In recent years, as the capacity of the disk storage device (disk storage) has been increased, dynamic image and sound are increasingly becoming stored in the disk storage device in an AV (Audio Visual) applications. In such an application, for real time input and output of the dynamic image and sound, it is required to define a lower limit value of the throughput of the storage, that is, to define a limit of its instantaneous performance degradation. However, in the conventional disk storage devices designed primarily to store static data, the average values of their throughput may be compared, but their instantaneous performance degradation is not taken into account. Therefore, when an error actually occurs, retries are executed as many times as possible to recover from the error. Then, when the number of retries reaches a predetermined number, it is decided that the sector is a defective sector, and reassignment of the defective sector is carried out.

However, in the above described AV application, retries extending over a long time result in pause of the image and dropout of the sound, and therefore cannot be accepted. Also, the devices are in the waiting state in the conventional disk storage devices unless being accessed from a host. Furthermore, because the reassignment of the defective sector is carried out when an error occurs during access from a host, depending on the number of retries, it may be a contributing factor of the instantaneous performance degradation. Furthermore, write errors are often associated with the servo system, and the occurrence of such errors in the servo system results in reassignments of the sector in which the error occurred as well as a plurality of subsequent sectors. Thus, many sectors are reassigned at a time, and this also greatly affects the instantaneous performance.

SUMMARY OF THE INVENTION

An object of the present invention is to provide a disk storage device which can overcome the above described problems and avoid the instantaneous performance degradation as much as possible, and a method for processing a defective sector in such a disk storage device.

A method for processing a defective sector in a disk storage device according to the present invention comprises the steps of: executing a predetermined check related to a function of the disk storage device, preferably at least one of a read test, write servo test, and write test, when the disk storage device is in a waiting state where the disk storage device has no access from a host. Thereby, the read test and write servo test are to search for a defective sector on the disk and reassign the defective sector, and the write test is to indicate the abnormal condition of the head.

According to the present invention, the waiting state of the disk storage device during which it has no access from a host is utilized to execute during that time the predetermined check, preferably the read test, write servo test, and write test, to reassign the defective sector and to ascertain the status of the head in advance. The probability that the reassignment will occur when the data is actually accessed by a host command can be reduced, and the performance degradation can be prevented.

In the preferred embodiment of the present invention, it is contemplated that (1) if a host command is generated when each test is being executed, the test which is being executed is suspended, and the generated host command is given a priority and executed, (2) the disk storage device is provided with a register, in which the position of the sector which is accessed for the check currently being executed is stored, and the position is sequentially updated as the check proceeds, and wherein (a) the content of the register is stored in the disk when a predetermined time has elapsed after the supply of the command from the host stopped, so that the value of the accessed sector can be recovered even after the power is shut off and the content of the register is cleared, or (b) when a host command is provided during a check, the value of the accessed sector which is to be accessed to restart the check can be recovered by the content of the register, and that (3) the disk storage device is provided with a mode flag, in which the type of the test currently being executed is stored. In either case, the above described processing of the defective sector of the present invention may be executed.

Furthermore, the disk storage device according to the present invention comprises means for detecting that the disk storage device is in the waiting state, and means for executing a predetermined check related to a function of the disk storage device, preferably at least one of the read test, write servo test, or write test, in response to the detecting means.

DETAILED DESCRIPTION OF A PREFERRED EMBODIMENT

Figure 1:
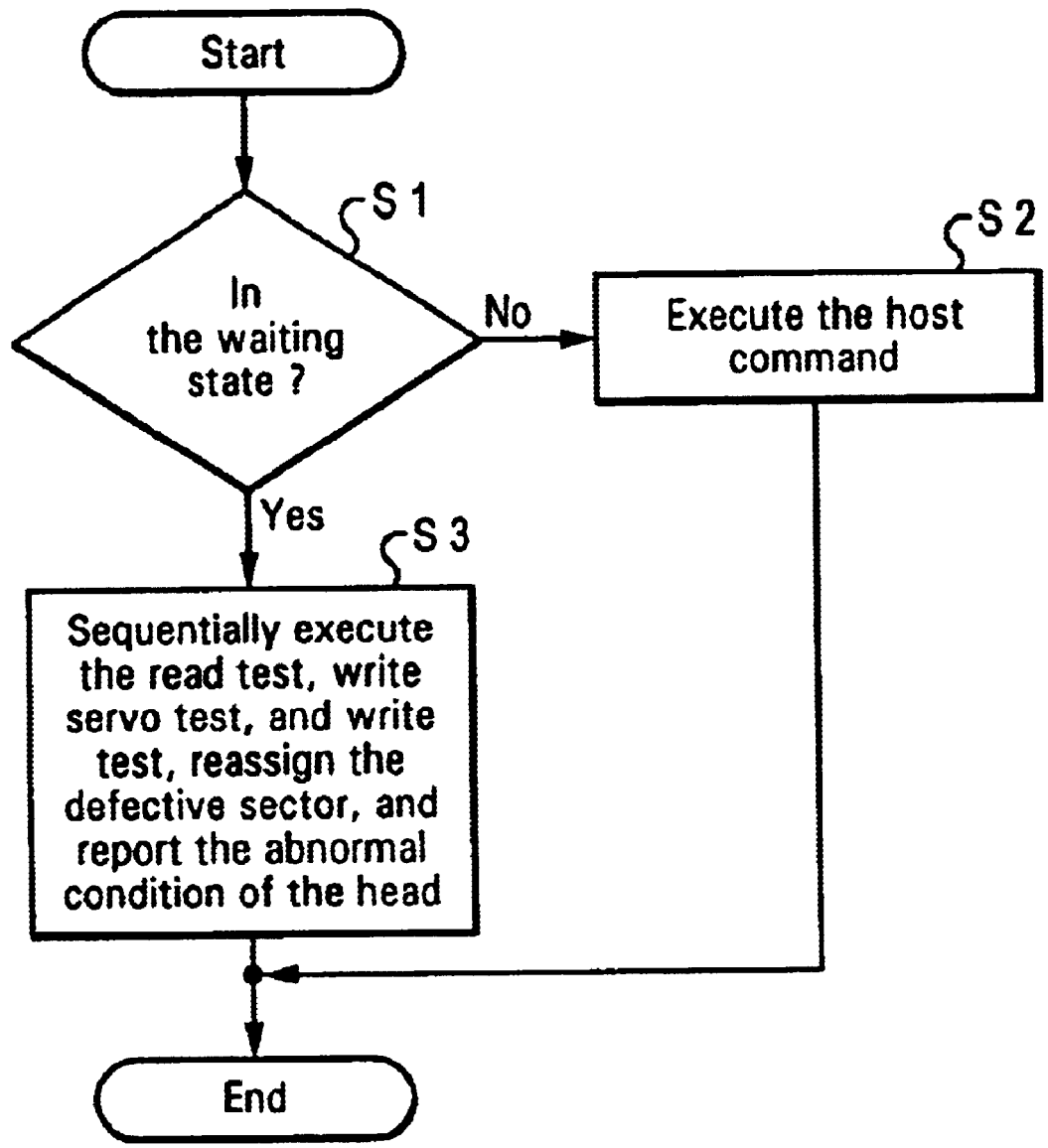
FIG. 1 is a flowchart describing an embodiment of a general concept of the method for processing the defective sector in the disk storage device of the present invention.

FIG. 1 is a flowchart describing an embodiment of a general concept of the method for processing the defective sector in the disk storage device of the present invention. In the description according to FIG. 1, first, it is decided whether the disk storage device is in the waiting state (step S1). Referring to whether in the waiting state or not, if the device has no access from a host after a lapse of a predetermined time, it is decided that it is in the waiting state, and if the device has an access from a host within the predetermined time, it is decided that it is not in the waiting state. And, if the device is not in the waiting state, a host command which is currently executed, or generated within the above described predetermined time after the execution is finished, is executed (step S2).

Next, if it is decided that the device is in the waiting state, first, a read test, a write servo test, and a write test are sequentially executed, that is, for searching for a defective sector. The read test is executed by serial reading, and the write servo test is executed by positioning the head to a writing position, and for deciding whether there is an abnormal condition in the head. The write test is executed by writing data to a particular sector. As a result, if a defective sector is found by the read test or write servo test, the defective sector is reassigned to an alternate sector formed in a spare area on the disk. If the abnormal condition of the head is found by the write test, the user is informed of it (step S3). Incidentally, the present invention can be achieved by executing at least one of these tests. This step S3 is repeated sequentially as long as the waiting state persists. If a command is provided by a host during each test, this command is given a high priority, and the test which is being executed is suspended, and the host command is executed.

Each of the above described steps will be described below in more detail. In the following description, an embodiment will be described, in which a controller of the disk storage device is provided with a mode flag for indicating which one of the read test, write servo test, or write test is actually executing, and a register which stores an address value for indicating the sector currently being accessed.

1. Decision on whether in the waiting state or not (step S1): In step S1, in conjunction with POR (Power On Reset), the register is initialized. At this time, the content of the register may be restored to the state of the register during the previous activation, which is stored in the disk of the disk storage device. Next, when a predetermined time is elapsed after the supply of the command from the host stopped, it is decided that the device is in the waiting state by the MPU in the disk storage device, and the content of the register as of that point in time is written to the disk. This is preferred, because at the time of next execution, reference to the content allows the head to be moved directly to the sector at the position where the test is to be executed. The content of the register is sequentially updated as the address of the sector which is accessed during execution moves.

2. Execution of the host command (step S2): In step S2, in the condition that the host commands are continuously provided to the disk storage device, in other words, in the condition that the next host command is generated within a predetermined time after the supply of a host command stopped, it is decided that the disk storage device is not in the waiting state, and it executes the host commands.

3. Performing the test and reassignment (step S3): In step S3, the MPU in the disk storage device complies with the microcode to test the function of the disk storage device, for example, in the order of the read test, write servo test, and write test. Then, if a defective sector is found by the read test or write servo test, the defective sector is reassigned by allocating it to a sector in the area for reassignment of the disk. If a failure of the head is found by the write test, the user is informed of it, for example, by means of indicating the presence of defect in this disk storage device on the display. The content of the mode flag is sequentially updated according to the content of the test which is actually being executed.

Here, the read test is to sequentially execute reading on all of the tracks, and decide that the sector in the tracks which cannot be read is the defective sector. This read test is executed on all of the tracks, that is, regardless of whether they are data-recorded areas or data-unrecorded areas, and if a defective sector is found, reassigns it. The write servo test is to offset the head to the writing position in each track, and measure the precision of the positioning in each servo sector. If it is decided that the precision of the positioning is low in a sector, it is decided that the sector is a defective sector, and the defective sector as well as a plurality of subsequent sectors are reassigned. The write servo test is sequentially executed on all tracks. It is enough to measure the dispersion and average value of about 10 laps of each track. The write test is to write data to the area for the write test identified on each disk face in advance, read this area, and to ascertain whether the data is written. If the data is not properly written, it is decided that the head has an abnormal condition, and the user is informed of it.

If a host command is provided during a test, this host command is given a high priority and executed. When the execution of the host command is finished, then the previously suspended test is executed according to the type of the test suspended and the sector address value obtained from the content of the mode flag and the content of the register. During the test, the content of the register is preferably saved in the disk at appropriate time intervals, or once in an appropriate number of accesses. Then, when the test has been completed, the test is executed again from the start. Alternatively, the next test may be started after a certain time.

Figure 2:
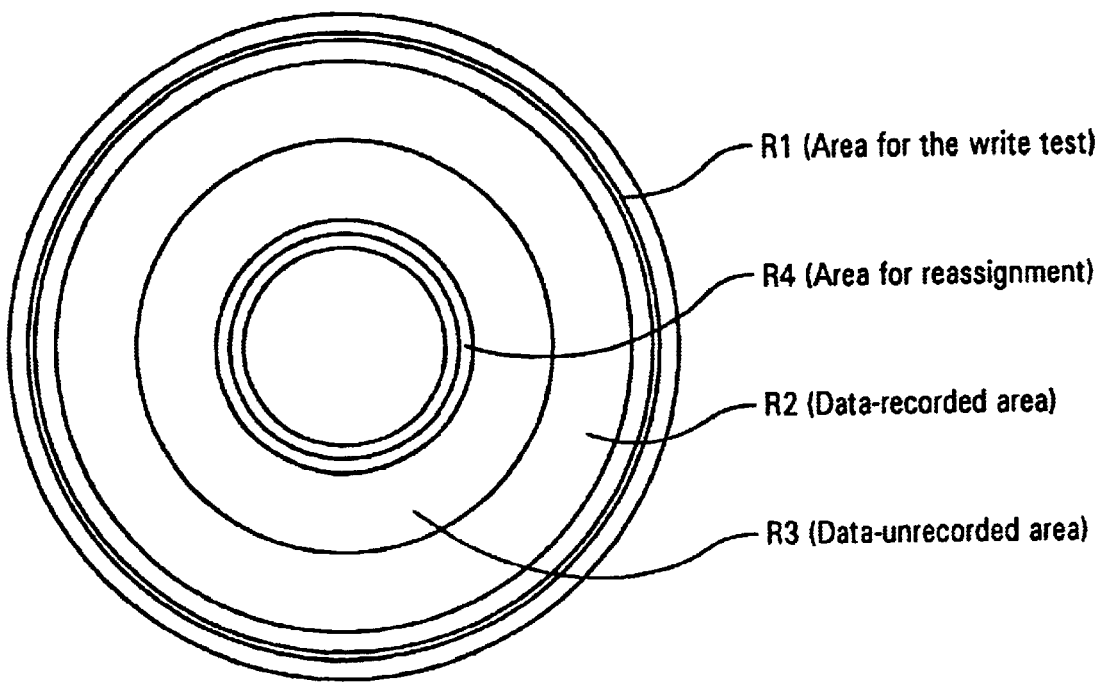
FIG. 2 shows an embodiment of the configuration of the disk, on which the method for processing a defective sector in a disk storage device of the present invention is executed.

FIG. 2 shows an embodiment of the configuration of the disk, on which the method for processing a defective sector in a disk storage device of the present invention is executed. The disk shown in FIG. 2 is provided with an area for the write test R1, a data-recorded area R2, a area R3, and an area for reassignment R4, from the outer peripheral to the inner peripheral on it. Here, the area for the write test R1 is the area which is written in the write test. The area for reassignment R4 is the area in which the reassignment is executed when the defective sector is found in the read test or write servo test. In the method for processing the defective sector in a disk storage device of the present invention, whenever the device is in the waiting state, the test is executed so that the defective sector is reassigned and the abnormal condition of the head is ascertained. Therefore, even if it is temporarily decided that a sector is the defective sector due to refuse and dust, when the test is executed again under the condition of refuse and dust being removed, it is decided that sector is not the defective sector, thus the optimal disk access may be provided at all times. And as shown in FIG. 2, if there is a data-unrecorded area R3 on the disk, the temporal performance degradation during recording of data to the data-unrecorded area R3 can be conveniently prevented.

As will be obvious from this description, according to the present invention, by executing the test for the defective sector and the abnormal condition of the head at all times during the waiting state, the defective sector and the abnormal condition of the head may be found independently of an access from a host, and then the defective sector may be reassigned, or the abnormal condition of the head may be informed to the user, thus the instantaneous performance degradation associated with the recovery can be prevented.

What is claimed is:

1. A method for processing defective sectors in a disk storage device, comprising the step of:

detecting that the disk storage device is in a waiting state such that the disk storage device is not being accessed by a host; and executing a predetermined check related to a function of the disk storage device when the disk storage device is in the waiting state by executing a write servo test for searching for defective sectors on disks and reassigning the defective sectors.

2. The method for processing defective sectors in a disk storage device according to claim 1, wherein the step of executing said predetermined check further comprises the step of executing a read test for searching for defective sectors on disks and reassigning the defective sectors.

3. The method for processing defective sectors in a disk storage device according to claim 1, wherein the step of executing said predetermined check further comprises the step of executing a write test for searching for indicating an abnormal condition of heads included within said disk storage device.

4. The method for processing defective sectors in a disk storage device according to claim 1, further comprising the steps of:
generating a host command while said predetermined check is being executed;
suspending said predetermined check which is being executed; and
executing said generated host command such that said host command is given priority.

5. The method for processing defective sectors in a disk storage device according to claim 1, further comprising the steps of:
providing a register within said disk storage device in which a position of a sector accessed during said predetermined check currently being executed is stored;
sequentially updating said position as the check proceeds; and
storing a content of said register in the disk when a predetermined time has elapsed after said disk storage device is no longer being accessed by a host utilizing a command, so that the value of the accessed sector can be recovered even after the power is shut off and the content of the register is cleared.

6. The method for processing defective sectors in a disk storage device according to claim 5, further comprising the step of storing the content of said register in the disk at regular time intervals.

7. The method for processing defective sectors in a disk storage device according to claim 5, further comprising the step of storing the content of said register in the disk once in a number of accesses.

8. The method for processing defective sectors in a disk storage device according to claim 1, further comprising the steps of:
providing a register within said disk storage device in which a position of a sector accessed during said predetermined check currently being executed is stored;
sequentially updating said position as the check proceeds; and
recovering the content of the register including the value of the accessed sector which is to be accessed to restart the check when a host command is provided during the check.

9. The method for processing defective sectors in a disk storage device according to claim 8, further comprising the step of storing the content of said register in the disk at regular time intervals.

10. The method for processing defective sectors in a disk storage device according to claim 8, further comprising the step of storing the content of said register in the disk once in a number of accesses.

11. The method for processing defective sectors in a disk storage device according to claim 1, further comprising the step of providing a mode flag within the disk storage device in which the type of the test currently being executed is stored.

12. A disk storage device for processing defective sectors the device, comprising:
means for detecting that the disk storage device is in a waiting state such that the disk storage device is not being accessed by a host; and
means for executing a predetermined check related to a function of the disk storage device when the disk storage device is in the waiting state by executing a write servo test for searching for defective sectors on disks and reassigning the defective sectors.

13. The device according to claim 12, wherein said means for executing said predetermined check further comprises means for executing a read test for searching for defective sectors on disks and reassigning the defective sectors.

14. The device according to claim 12, wherein said means for executing said predetermined check further comprises means for executing a write test for searching for indicating an abnormal condition of heads included within said disk storage device.

15. The device according to claim 12, further comprising:
means for generating a host command while said predetermined check is being executed;
means for suspending said predetermined check which is being executed; and
means for executing said generated host command such that said host command is given priority.

16. The device according to claim 12, further comprising:
a register within said disk storage device in which a position of a sector accessed during said predetermined check currently being executed is stored;
means for sequentially updating said position as the check proceeds; and
means for storing a content of said register in the disk when a predetermined time has elapsed after said disk storage device is no longer being accessed by a host utilizing a command, so that the value of the accessed sector can be recovered even after the power is shut off and the content of the register is cleared.

17. The device according to claim 16, further comprising means for storing the content of said register in the disk at regular time intervals.

18. The device according to claim 16, further comprising means for storing the content of said register in the disk once in a number of accesses.

19. The device according to claim 12, further comprising:
a register within said disk storage device in which a position of a sector accessed during said predetermined check currently being executed is stored;
means for sequentially updating said position as the check proceeds; and
means for recovering the content of the register including the value of the accessed sector which is to be accessed to restart the check when a host command is provided during the check.

20. The device according to claim 19, further comprising means for storing the content of said register in the disk at regular time intervals.

21. The device according to claim 19, further comprising means for storing the content of said register in the disk once in a number of accesses.

22. The device according to claim 12, further comprising means for providing a mode flag within the disk storage device in which the type of the test currently being executed is stored.

* * * * *